UNITED STATES PATENT OFFICE.

ISAAC P. WENDELL, OF PHILADELPHIA, PENNSYLVANIA, ASSIGNOR TO CHARLES P. TASKER, OF SAME PLACE.

COMPOSITION OF MATTER FOR THE MANUFACTURE OF AXLE-BEARINGS.

SPECIFICATION forming part of Letters Patent No. 325,881, dated September 8, 1885.

Application filed February 14, 1885. (No specimens.)

*To all whom it may concern:*

Be it known that I, ISAAC P. WENDELL, a citizen of the United States, residing at Philadelphia, in the county of Philadelphia and 5 State of Pennsylvania, have invented a new and useful Composition of Matter, of which the following is a specification.

The object of my invention is to provide an inexpensive material having the proper hard10 ness and durability for the manufacture of axle or journal bearings, packings for pistons, and like articles.

My invention consists of a compound composed of talc or soapstone and silicate of soda.
15 The talc or soapstone having first been reduced to a fine or powdered condition, is well mixed with silicate of soda, molded into the desired form, and dried by artificial or natural heat.

The proportions of the materials above 20 named which I have found to produce a good article are one pound of talc or soapstone and one-half pound of silicate of soda. These proportions, however, may be varied without departing from my invention. 25

Having thus described my invention, I claim—

A composition of matter consisting of talc or soapstone and silicate of soda, substantially as above set forth. 30

In testimony whereof I have hereunto signed my name this 3d day of February, A. D. 1885.

ISAAC P. WENDELL.

In presence of—
WM. C. STRAWBRIDGE,
J. BONSALL TAYLOR.